United States Patent Office.

CHARLES N. WAITE, OF MEDFORD, ASSIGNOR OF THREE-FOURTHS TO JOSEPH STONE, OF LAWRENCE, AND JOHN H. ALLEY, OF LYNN, MASSACHUSETTS.

MANUFACTURE OF LACTIC ACID.

SPECIFICATION forming part of Letters Patent No. 365,655, dated June 28, 1887.

Application filed October 13, 1886. Serial No. 216,177. (No specimens.)

*To all whom it may concern:*

Be it known that I, CHARLES N. WAITE, of Medford, in the county of Middlesex and State of Massachusetts, have invented certain new and useful Improvements in the Manufacture of Lactic Acid, of which the following is a specification.

My invention relates to the manufacture of lactic acid; and it consists in the fermentation of glucose or other well-known fermentable sugars in the presence of a small percentage of glue and a suitable neutralizer. I prefer to use about the following proportions: grape sugar, one hundred pounds; glue, five to ten pounds; carbonate of calcium, fifty pounds; water, five hundred to eight hundred pounds. To this is added a small quantity of lactic ferment. I warm the mixture to about 105° Fahrenheit, when a violent lactic fermentation begins and continues until nearly all of the sugar is changed to lactic acid. This usually occurs in from four to ten days, the rapidity of the fermentation depending on the amount of glue used. The carbonate of calcium is used to neutralize the acid as fast as formed, since the fermentation is checked if the acid accumulates above two or three per cent. I do not confine myself to carbonate of calcium as a neutralizer, but may use any of the neutralizers now ordinarily used for this purpose. I prefer to cover the surface of the fermenting mixture with a thin layer of petroleum-oil to exclude air and foreign germs.

The lactic ferment needs a considerable quantity of soluble nitrogenous matter for its best development, and this is supplied by the glue. I prefer glue to other nitrogenous matters for the following reasons:

First. Its complete solubility. Caseine coagulates and vegetable gluten is largely insoluble in dilute lactic acid. There is always some free acid during fermentation, and this makes the glue more soluble, while it would coagulate caseine or gluten to a large extent.

Second. The glue carries with it no oil, as does caseine and the gluten of cornmeal, and it has no coloring-matter like the vegetable glutens. Oil, coloring-matter, and vegetable gluten are all difficult of removal in the after purification of lactic acid. In my combination there is no oil or coloring-matter, and if all the glue is not used by the ferment for its sustenance it may be readily removed by an addition of gallotannic acid.

I claim—

1. The process of making lactic acid by the fermentation of a fermentable sugar in the presence of glue, a neutralizer, and lactic ferment, as set forth.

2. The improved step in the lactic fermentation, consisting in the addition of glue to a solution of a fermentable sugar with a neutralizer and lactic ferment, as set forth.

In testimony whereof I have signed my name to this specification, in the presence of two subscribing witnesses, this 9th day of October, A. D. 1886.

CHARLES N. WAITE.

Witnesses:
 ARTHUR W. CROSSLEY,
 A. D. HARRISON.